United States Patent

Strong

[11] Patent Number: 5,975,137
[45] Date of Patent: *Nov. 2, 1999

[54] POWER STEERING CONTROL VALVE

[75] Inventor: Daniel J. Strong, Clinton Township, Mich.

[73] Assignee: TRW Inc., Lyndhurst, Ohio

[*] Notice: This patent is subject to a terminal disclaimer.

[21] Appl. No.: 08/762,600

[22] Filed: Dec. 9, 1996

[51] Int. Cl.⁶ ........................................................ F15B 9/10
[52] U.S. Cl. ........................................ 137/625.23; 91/375 A
[58] Field of Search ....................... 91/375 A; 137/625.23

[56] References Cited

U.S. PATENT DOCUMENTS

| | | | |
|---|---|---|---|
| 5,645,107 | 7/1997 | Kobayashi et al. | 137/625.23 |
| 5,690,143 | 11/1997 | Birsching | 137/625.23 |

Primary Examiner—Gerald A. Michalsky
Attorney, Agent, or Firm—Tarolli, Sundheim, Covell, Tummino & Szabo LLP

[57] ABSTRACT

A hydraulic fluid control valve (18) for a power steering gear (10) includes first and second relatively rotatable valve members (60, 62) which direct hydraulic fluid to flow between the valve members (60, 62) from inlet ports (78) to return ports (108). The valve members (60, 62) define a plurality of orifices (110) that enlarge and a plurality of orifices (110) that constrict upon relative rotation of the valve members (60, 62). A pair of the constricting orifices (110b, 110c) are located in parallel between the inlet ports (78) and the return ports (108). Those orifices (110b, 110c) begin to constrict at the same time, and subsequently reach fully constricted conditions at staggered times, upon relative rotation of the valve members (60, 62) from neutral positions.

3 Claims, 6 Drawing Sheets

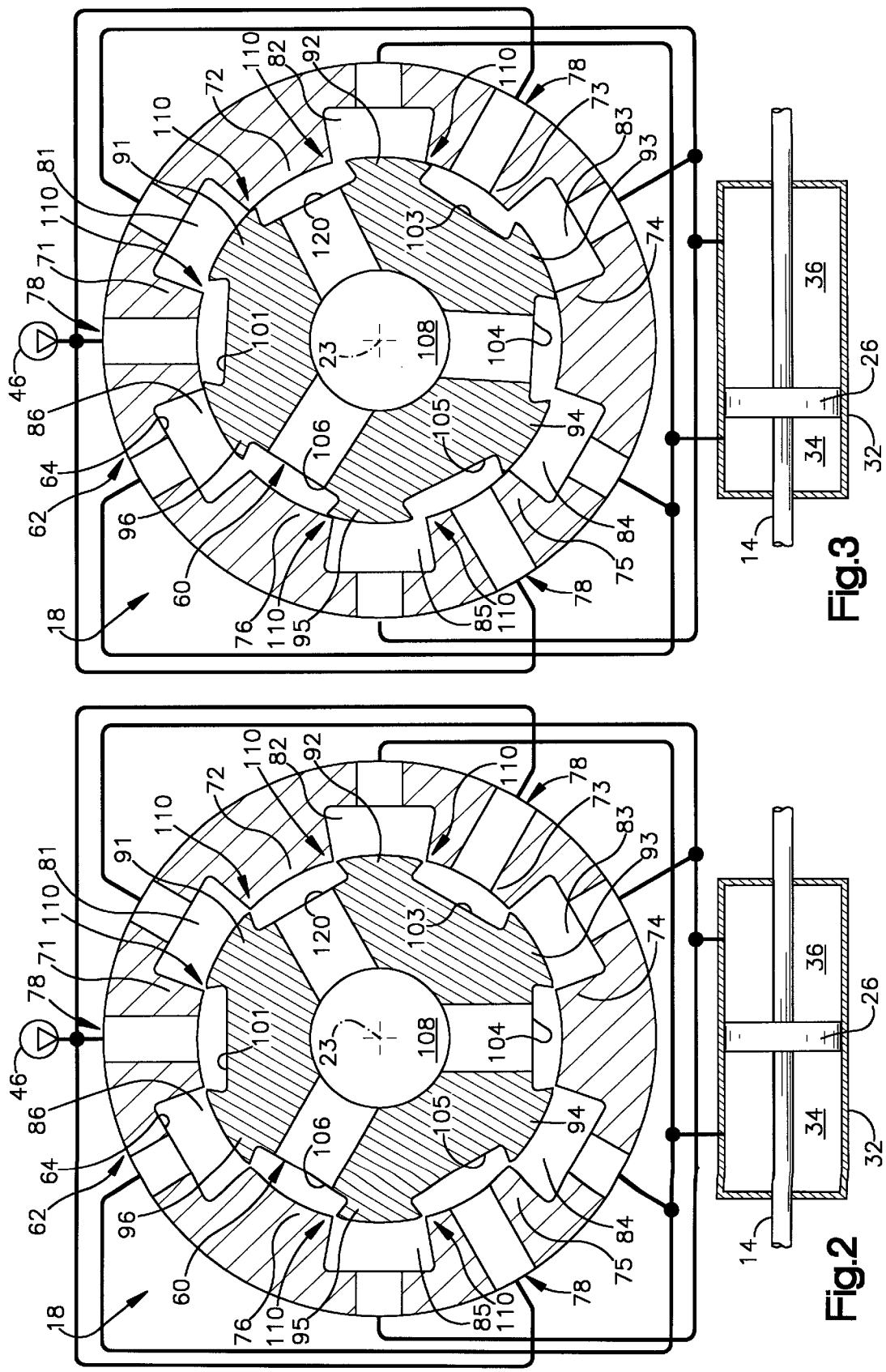

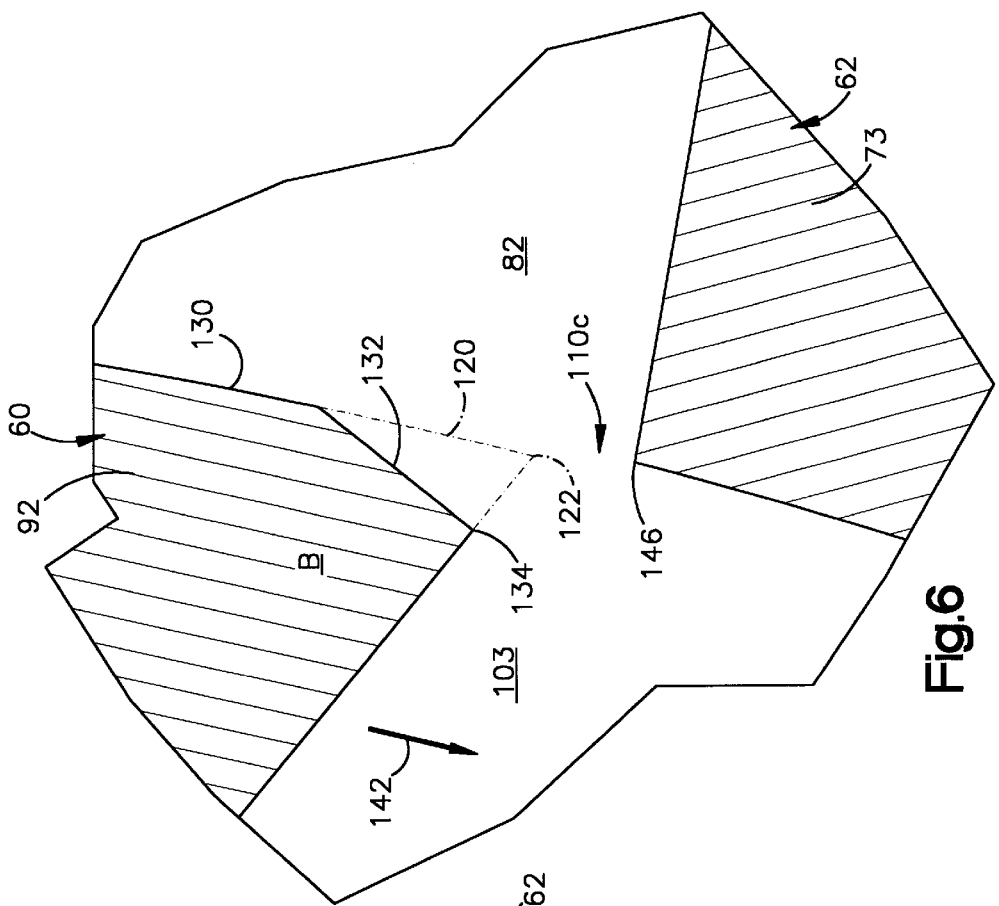
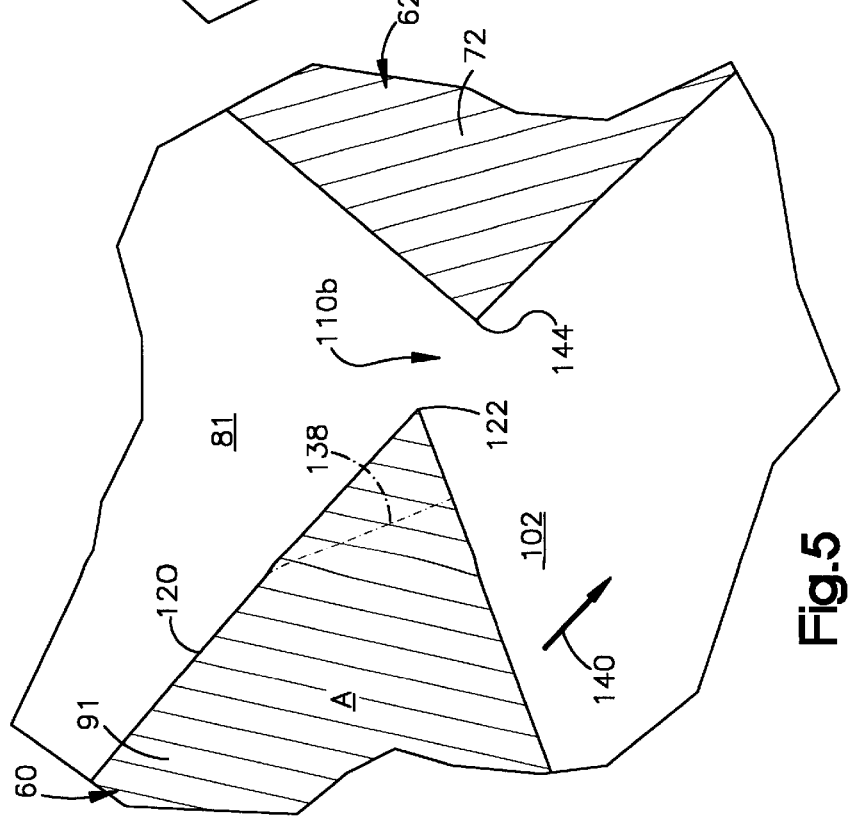

The present invention relates to a hydraulic fluid control valve for a power steering gear.

POWER STEERING CONTROL VALVE

BACKGROUND OF THE INVENTION

1. Technical Field

The present invention relates to a hydraulic fluid control valve for a power steering gear.

2. Description of the Prior Art

A known hydraulic fluid control valve for a power steering gear includes a valve core rotatable within a valve sleeve. The core and the sleeve control the pressure of hydraulic fluid flowing through the valve between a pump, a reservoir, and a pair of opposed fluid chambers in a hydraulic motor. When the core and the sleeve are in neutral positions, the hydraulic fluid pressures in the opposed fluid chambers are equal. When the core and the sleeve are rotated from the neutral positions, a plurality of lands and grooves on the core and the sleeve cooperate to increase the hydraulic fluid pressure in one of the opposed fluid chambers, and thereby to provide hydraulic power steering assist in the steering gear.

SUMMARY OF THE INVENTION

In accordance with the present invention, an apparatus comprises first and second relatively rotatable valve members which direct hydraulic fluid to flow between the valve members from inlet ports to return ports. The valve members define orifices that enlarge and orifices that constrict upon relative rotation of the valve members from neutral positions.

A pair of the constricting orifices are located in parallel between the inlet ports and the return ports. Those orifices begin to constrict at the same time, and subsequently reach fully or substantially fully constricted conditions at staggered times, upon relative rotation of the valve members from neutral positions.

BRIEF DESCRIPTION OF THE DRAWINGS

Further features of the present invention will become apparent to those skilled in the art to which the present invention relates from reading the following description with reference to the accompanying drawings, in which:

FIG. 2 is a view of parts of the apparatus of FIG. 1, with certain parts being shown in section and with other parts being shown schematically;

FIG. 3 is a view similar to FIG. 2 showing parts in different positions;

FIGS. 5 and 6 are enlarged partial views of parts shown in FIG. 4;

DESCRIPTION OF PREFERRED EMBODIMENTS

Figure 1:
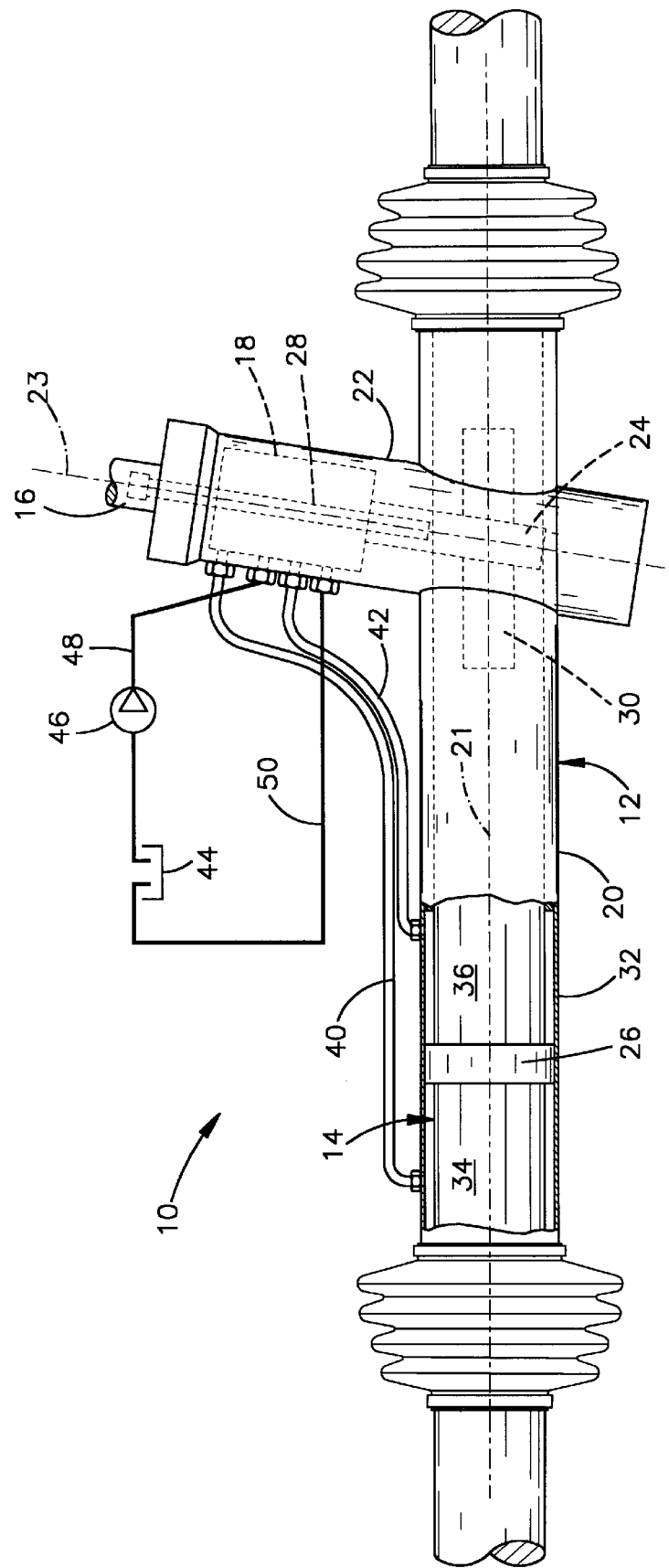
FIG. 1 is a view of an apparatus comprising a preferred embodiment of the present invention.

A hydraulic power steering gear 10 comprising a preferred embodiment of the present invention is shown in FIG. 1. The steering gear 10 is a hydraulically-assisted rack and pinion steering gear including a housing 12, an elongate steering rack 14, and an input shaft 16. As shown schematically in FIG. 1, the steering gear 10 further includes a hydraulic fluid control valve 18 which is contained in the housing 12.

The rack 14 extends longitudinally through a lower portion 20 of the housing 12 along a horizontal axis 21, and is supported for movement relative to the housing 12 along the axis 21. When the steering gear 10 is installed in a vehicle, the opposite ends (not shown) of the rack 14 are connected to steering linkages which, in turn, connect the steering gear 10 to a pair of steerable vehicle wheels.

The input shaft 16 projects outward from an upper portion 22 of the housing 12 along another axis 23, and is rotatable about the axis 23 in response to rotation of the vehicle steering wheel. The steering gear 10 operates to move the rack 14 along the axis 21 in response to rotation of the input shaft about the axis 23. The steering gear thus actuates the steering linkages to steer the vehicle wheels in response to rotation of the steering wheel.

Other parts of the steering gear 10 include a pinion gear 24 and a piston 26. The pinion gear 24 is connected with the input shaft 16 by a torsion bar 28, and is supported for rotation about the axis 23 in meshing engagement with a row of rack teeth 30 on the rack 14. A tubular section 32 of the lower housing portion 20 functions as a power cylinder. The piston 26 is fixed to the rack 14 within the power cylinder 32. A pair of variable volume hydraulic fluid chambers 34 and 36 are located in the power cylinder 32 on opposite sides of the piston 26.

The valve 18 communicates with the first chamber 34 in the power cylinder 32 through a first two-way conduit 40. The valve 18 further communicates with the second chamber 36 in the power cylinder 32 through a second two-way conduit 42. As further shown schematically in FIG. 1, the valve 18 receives hydraulic fluid from a reservoir 44 and a pump 46 through an inlet conduit 48. The pump 46 could be a flow-varying pump, and could be driven by an electric motor or by the vehicle engine. An outlet conduit 50 exhausts hydraulic fluid from the valve 18 to the reservoir 44.

The valve 18 operates in response to rotation of the input shaft 16 with the vehicle steering wheel. When the input shaft 16 rotates with the steering wheel in a first direction about the axis 23, it rotates slightly relative to the pinion gear 24. The torsion bar 28 flexes to permit such rotation of the input shaft 16 relative to the pinion gear 24. The valve 18 responds to the resulting rotational displacement by opening hydraulic fluid flow paths that extend through the valve 18 from the inlet conduit 48 to the first two-way flow conduit 40. The valve 18 simultaneously opens hydraulic fluid flow paths that extend through the valve 18 from the second two-way flow conduit 42 to the outlet conduit 50. As a result, the valve 18 communicates the pump 46 with the first chamber 34 in the power cylinder 32 to pressurize the first chamber 34, and simultaneously communicates the second chamber 36 in the power cylinder 32 with the reservoir 44 to exhaust the second chamber 36. A resulting flow of hydraulic fluid from the pump 46, and a resulting hydraulic fluid pressure differential acting across the piston 26, cause the piston 26 and the rack 14 to move to the right, as viewed in FIG. 1, along the axis 21. This causes the steering linkage to steer the vehicle wheels in a first direction.

As the rack moves along the axis 21 with the piston 26, the pinion gear 24 rotates in meshing engagement with the rack teeth 30. The pinion gear 24 thus rotates about the axis 23 relative to the input shaft 16 in a follow-up manner so as to cancel the rotational displacement between the pinion gear 24 and the input shaft 16. The valve 18 responds by closing the previously opened hydraulic fluid flow paths. This equalizes the hydraulic fluid pressures acting on the piston 26 in the two chambers 34 and 36 in the power cylinder 32, and causes the piston 26 and the rack 14 to stop moving along the axis 21.

When the vehicle wheels are to be steered in an opposite direction, the input shaft 16 is rotated with the steering wheel in an opposite direction about the axis 23, and is again rotated slightly relative to the pinion gear 24 upon flexing of the torsion bar 28. The valve 18 responds by pressurizing the second chamber 36 and by simultaneously exhausting the first chamber 34. The piston 26 and the rack 14 then move axially to the left, as viewed in FIG. 1. A resulting follow-up rotation of the pinion gear 24 relative to the input shaft 16 causes the valve 18 again to equalize the hydraulic fluid pressures in the two chambers 34 and 36 in the power cylinder 32. The steering gear 10 thus steers the vehicle wheels in directions and amounts corresponding to the directions and the amounts of rotation of the steering wheel and the input shaft 16.

As shown in FIG. 2, the valve 18 includes a valve core 60 and a valve sleeve 62. Both the core 60 and the sleeve 62 have generally cylindrical shapes centered on the axis 23. The core 60 is defined by a section of the input shaft 16 (FIG. 1). The sleeve 62 is connected with an upper end portion of the pinion gear 24 (FIG. 1). Accordingly, the core 60 and the sleeve 62 rotate relative to each other when the input shaft 16 and the pinion gear 24 rotate relative to each other. As described in detail below, the core 60 and the sleeve 62 then vary the hydraulic fluid flow paths extending through the valve 18 so that certain flow paths become relatively unrestricted and certain flow paths become relatively restricted. Pressurized flows of hydraulic fluid are thereby directed through the valve 18 between the pump 46 and the chambers 34 and 36 in the power cylinder 32, as described above with reference to FIG. 1.

The sleeve 62 has a radially inner periphery 64 extending circumferentially around the core 60. The inner periphery 64 of the sleeve 62 has an undulating contour defined by a plurality of circumferentially spaced lands and grooves. Specifically, the sleeve 62 has six lands 71, 72, 73, 74, 75 and 76 which are equally spaced from each other circumferentially about the axis 23. The sleeve 62 further has six grooves 81, 82, 83, 84, 85 and 86, each of which is located circumferentially between a pair of adjacent lands.

Three inlet ports 78 extend radially inward through the sleeve 62 at the locations of the first land 71, the third land 73, and the fifth land 75. As shown schematically in FIG. 2, the inlet ports 78 receive hydraulic fluid from the pump 46.

As further shown schematically in FIG. 2, the grooves 81–86 on the sleeve 62 communicate with the fluid chambers 34 and 36 in the power cylinder 32. The first, third and fifth grooves 81, 83 and 85 communicate with the chamber 36 on the right side of the piston 26, as viewed in FIG. 2. The second, fourth and sixth grooves 82, 84 and 86 communicate with the other chamber 34 on the left side of the piston 26.

The core 60 also has an undulating contour defined by a plurality of lands and grooves. These include six lands 91–96 and six grooves 101–106. The lands 91–96 on the core 60 are located radially opposite the grooves 81–86 on the sleeve 62. The grooves 101–106 on the core 60 are located radially opposite the lands 71–76 on the sleeve 62. Accordingly, the adjacent corners of the lands 71–76 and 91–96 define orifices 110 between the grooves 81–86 and 101–106. Three of the grooves 102, 104 and 106 on the core 60 communicate with the reservoir 44 (FIG. 1) through corresponding branches of a return port system 108 within the core 60.

When a steering maneuver is not being performed, the core 60 and the sleeve 62 are located in neutral positions, as shown in FIG. 2. Hydraulic fluid then flows from the inlet ports 78 to the return port system 108 through the grooves 101–106, the grooves 81–86, and the orifices 110. This flow results from a pressure drop between the pump 46 and the reservoir 44. However, there is no pressure differential between the chambers 34 and 36 in the power cylinder 32 when a steering maneuver is not being performed. Accordingly, there is no pressure differential between the set of grooves 81, 83 and 85 that communicate with the right chamber 36 and the other set of grooves 82, 84 and 86 that communicate with the left chamber 34.

When the vehicle steering wheel and the input shaft 16 (FIG. 1) are turned to the right, the core 60 rotates relative to the sleeve 62 in a clockwise direction, as viewed in FIGS. 2 and 3. Six of the twelve orifices 110 are then enlarged, and the other six orifices 110 are then constricted. This causes the hydraulic fluid pressure to increase in the set of grooves 81, 83 and 85 that communicate with the right chamber 36 in the power cylinder 32, and simultaneously causes the hydraulic fluid pressure to decrease in the set of grooves 82, 84 and 86 that communicate with the left chamber 34. A small portion of the hydraulic fluid flow extending from the inlet ports 78 to the return port system 108 is thus diverted to the right chamber 36 through the grooves 81, 83 and 85. An equal flow of hydraulic fluid is simultaneously exhausted from the left chamber 34 to the other grooves 82, 84 and 86. The piston 26 and the rack 14 then move to the left, as viewed in FIG. 3. This causes the steering linkages to turn the steerable vehicle wheels to the right.

Figure 4:
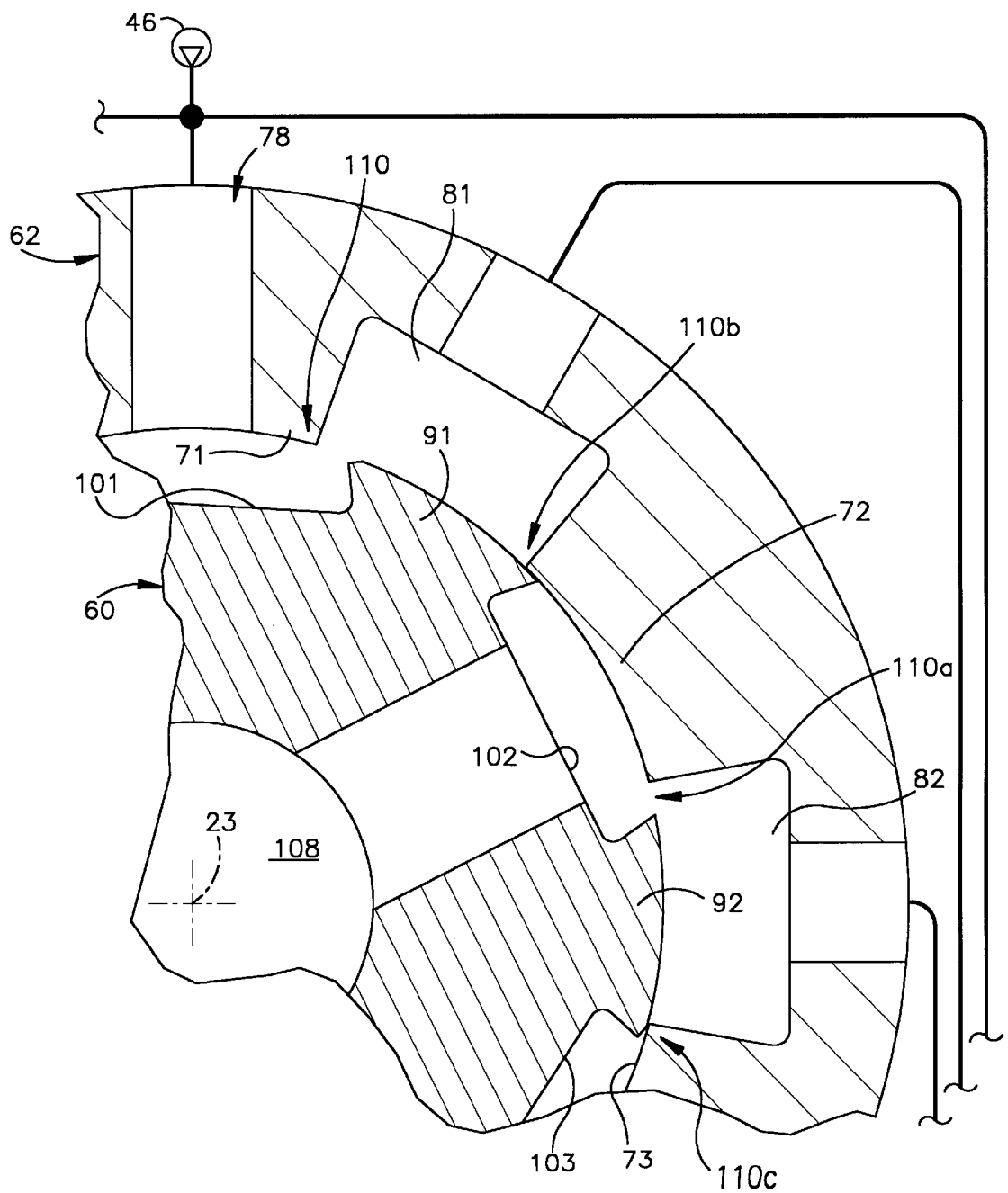
FIG. 4 is an enlarged partial view of parts shown in FIG. 3.

As shown in the enlarged view of FIG. 4, one of the orifices 110 that enlarges is differentiated from two of the orifices 110 that constrict upon rotation of the core 60 from the neutral position of FIG. 2 to the shifted position of FIG. 3. Specifically, one of the enlarging orifices 110 is designated by the reference number 110a in FIG. 4. An adjacent pair of constricting orifices 110 are designated by the reference numbers 110b and 110c. Those constricting orifices 110b and 110c are located in parallel between the inlet ports 78 and the return port system 108. In accordance with the present invention, the lands 91 and 92 on the core 60 are shaped so that those constricting orifices 110b and 110c begin to constrict at the same time, and subsequently reach fully constricted conditions at staggered times, when the core 60 is rotated from the neutral position of FIG. 2 to the shifted position of FIG. 3.

The first constricting orifice 110b of FIG. 4 is shown in further enlarged detail in FIG. 5, with the core 60 and the sleeve 62 being shown in the neutral positions. The orifice 110b is a gap between the first land 91 on the core 60 and the second land 72 on the sleeve 62.

As shown in FIG. 5, the first land 91 on the core 60 has a cylindrical surface 120. The cylindrical surface 120 has a circular radial contour centered on the axis 23 of rotation (FIGS. 2–4), and extends circumferentially from the corner 122 of the land 91 beside the adjacent groove 102.

The second constricting orifice 110c of FIG. 4 is shown in further enlarged detail in FIG. 6, also with the core 60 and the sleeve 62 being shown in the neutral positions. The orifice 110c is a gap between the second land 92 on the core 60 and the third land 73 on the sleeve 62.

The second land 92 on the core 60 also has a cylindrical surface 130 with a circular radial contour centered on the axis 23. However, the second land 92 further has a planar edge surface or facet 132 which is inclined radially inward from the cylindrical surface 130, and which extends from the cylindrical surface 130 to the corner 134 of the land 92 beside the adjacent groove 130. The second land thus has a tapered contour beside the orifice 110c which differs from the non-tapered contour of the first land 91 beside the orifice 110b. This is indicated in FIG. 6 by a dashed line 136 showing the contour of the first land 91 superimposed on the second land 92. FIG. 5 similarly has a dashed line 138 showing the contour of the second land 92 superimposed on the first land 91.

The orifices 110b and 110c constrict as the first and second lands 91 and 92 on the core 60 move relative to the sleeve 62 in the directions indicated by the arrows 140 and 142 shown in FIGS. 5 and 6. As described above, this occurs when the core 60 is rotated from the neutral position of FIG. 2 to the shifted position of FIG. 3. During an initial amount of such rotation, the corners 122 and 134 of the lands 91 and 92 move downward, as viewed in FIGS. 5 and 6, toward and past the opposed corners 144 and 146 on the sleeve 62, respectively.

Figure 14:
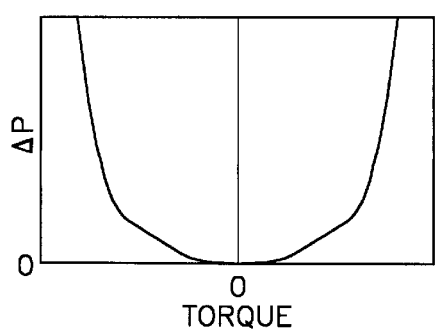
FIG. 14 is a graph showing performance characteristics of the apparatus of FIG. 1.

When the corner 122 on the first land 91 moves beside the corner 144 on the sleeve 62, the orifice 110b reaches a fully constricted condition, and no further constriction of the orifice 110b occurs as the cylindrical surface 120 of the first land 91 moves past the corner 144 upon continued rotation of the core 60 in the same direction. This preferably occurs when the core 60 has been rotated approximately one degree about the axis 23. However, the cylindrical surface 130 of the second land 92 (FIG. 6) has not yet reached the opposed corner 146 on the sleeve 62 at that time. Therefore, the orifice 110c continues to constrict as the facet 132 on the second land 192 moves past the corner 146 on the sleeve 62. This preferably continues for approximately 2.2 degrees of continued rotation of the core 60 in the same direction. The orifice 110c then reaches a fully constricted condition when the cylindrical surface 130 of the second land 92 moves beside the corner 146 of the sleeve 62. No further constriction of the orifice 110c occurs as the cylindrical surface 130 moves past the corner 146. The orifice 110b of FIG. 5 thus reaches its fully constricted condition before the orifice 110c of FIG. 6 reaches its fully constricted condition upon rotation of the core 60 relative to the sleeve 62 from the neutral position. This feature of the present invention enables the valve 18 to provide a linear relationship between the torque in the input shaft 16 (FIG. 1) and the pressure differential acting across the piston 26, if such a linear relationship is desired, as shown in FIG. 14.

Figure 7:
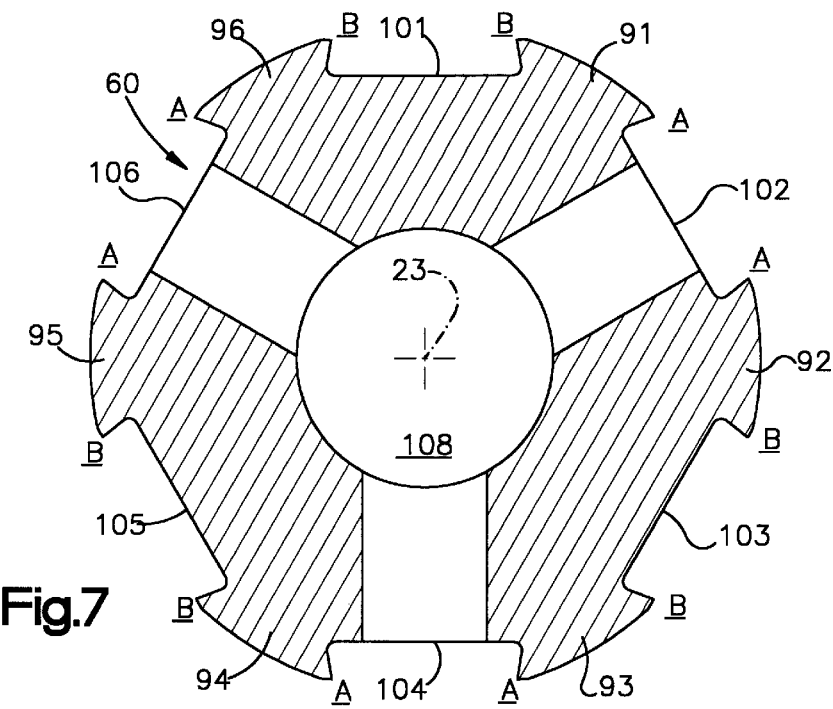
FIG. 7 is a view of a part shown in FIGS. 2 and 3.

As further shown in FIGS. 5 and 6, the contour of the first land 91 adjacent to the corner 122 is designated by the letter A. The contour of the second land 92 adjacent to the corner 134 is similarly designated by the letter B. FIG. 7 shows the preferred locations where the A and B contours are repeated about the circumference of the core 60. Specifically, each of the lands 91–96 on the core 60 has the A contour at one side of the land, and has the B contour at the circumferentially opposite side of the land. In this arrangement, any pair of constricting orifices 110 located in parallel between the inlet ports 78 and the outlet port system 108 will reach fully constricted conditions at staggered times in accordance with the present invention.

Figure 8:
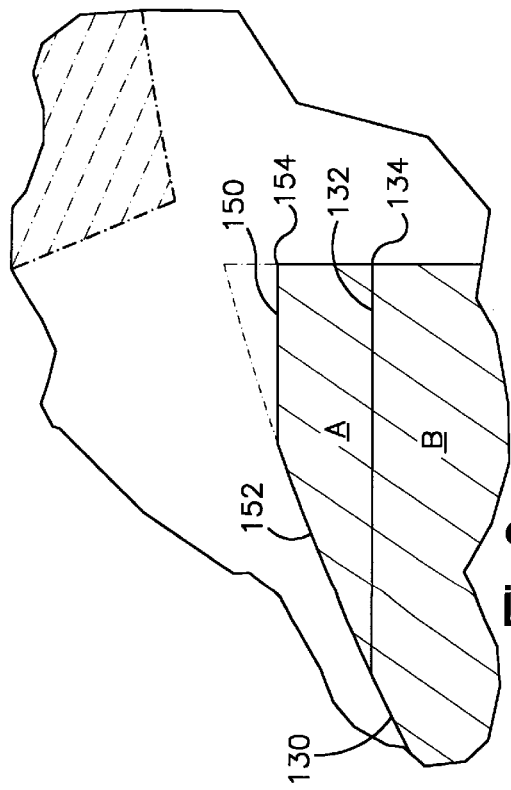
FIG. 8 is a partial view of an apparatus comprising a second embodiment of the present invention.

FIG. 8 shows a variation of the A contour of FIG. 5 superimposed on the B contour of FIG. 6. In this alternative embodiment of the present invention, the A contour is defined in part by a planar facet 150 which, in the superimposed view of FIG. 8, is parallel to, spaced radially outward from, and smaller than the corresponding facet 132 at the B contour. The cylindrical surface 152 at the A contour is thus spaced from the corresponding corner 154, but that spacing is less than the corresponding spacing at the B contour. Therefore, an orifice at the A contour will reach its fully constricted condition sooner than an orifice at the B contour in accordance with the present invention. These A and B contours would preferably have the same locations on a valve core as the A and B contours shown in FIG. 7.

Figure 9:
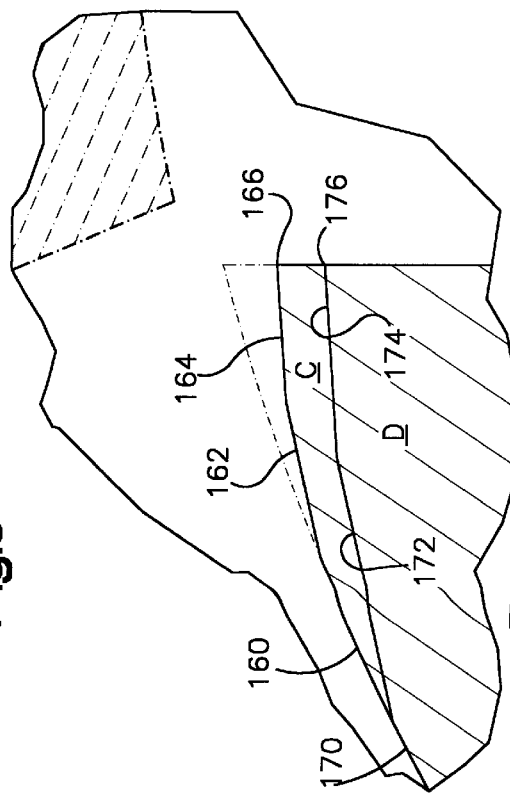
FIG. 9 is a partial view of an apparatus comprising a third embodiment of the present invention.

FIG. 9 also shows a superimposed pair of alternative contours C and D which can be used as alternatives for the A and B contours of FIGS. 5 and 6. The C contour is defined in part by a cylindrical surface 160, and in part by a pair of planar facets 162 and 164 extending successively from the cylindrical surface 160 to a corresponding corner 166. The facets 162 and 164 are both inclined radially inward from the cylindrical surface 160, with the second facet 162 having a greater angle of radially inward inclination.

The D contour of FIG. 9 is similarly defined by a cylindrical surface 170 and a pair of planar facets 172 and 174 extending successively from the cylindrical surface 170 to a corresponding corner 176. The facet 172 intersects the cylindrical surface 170, i.e., it departs from the contour of the cylindrical surface 170, at a location which is spaced circumferentially away from the location at which the facet 162 intersects the concentric cylindrical surface 160 in the superimposed relationship shown in FIG. 9. As a result, in accordance with the present invention, the C contour causes an associated orifice to reach a fully constricted condition before the D contour causes its corresponding orifice to reach a fully constricted condition. Additionally, the C and D contours of FIG. 9 help to reduce the amount of noise generated in the valve 18.

Figure 10:
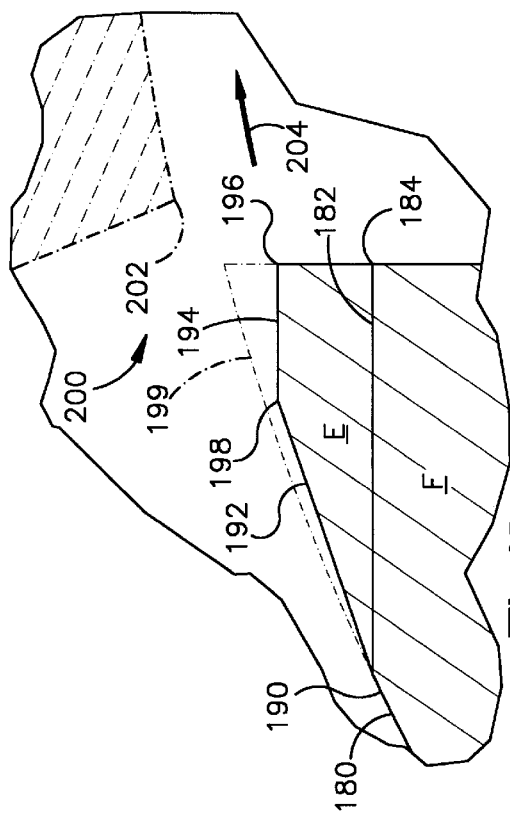
FIG. 10 is a partial view of an apparatus comprising a fourth embodiment of the present invention.

FIG. 10 also shows a superimposed pair of alternative contours E and F which can be used in accordance with the present invention. The F contour is defined by a cylindrical surface 180 and a planar facet 182 extending from the cylindrical surface 180 to a corresponding corner 184. The E contour is defined by a cylindrical surface 190 which is concentric with the cylindrical surface 180, and is further defined by a pair of planar facets 192 and 194 extending successively from the cylindrical surface 190 to a corresponding corner 196.

The facets 182 and 192 intersect their corresponding cylindrical surfaces 180 and 190 at the same point in the superimposed view of FIG. 10. Therefore, the E and F contours cause corresponding orifices to reach fully constricted conditions at the same time. However, the juncture 198 of the two facets 192 and 194 at the E contour nearly adjoins a circular line 199 projecting along the arc of the superimposed cylindrical surfaces 180 and 190. The juncture 198 of the two facets 192 and 194 is thus spaced a very small distance radially inward from a location at which the juncture 198 would cause a corresponding orifice 200 to become fully constricted. Accordingly, when the juncture 198 moves besides the opposed corner 202 in the direction indicated by the arrow 204 shown in FIG. 10, the orifice 200 therebetween is substantially fully constricted, whereas an orifice at the F contour would not become fully or substantially fully constricted until the cylindrical surface 180 moves beside a corresponding corner at a later time. The juncture 198 is preferably spaced from the circular line 199 a distance which is small enough for the substantially constricted condition of the orifice 200 to have a size within a range of 10%–25% of the sum of the sizes of the two orifices defined by the two contours E and F. The E and F contours also help to reduce noise.

Figure 11:
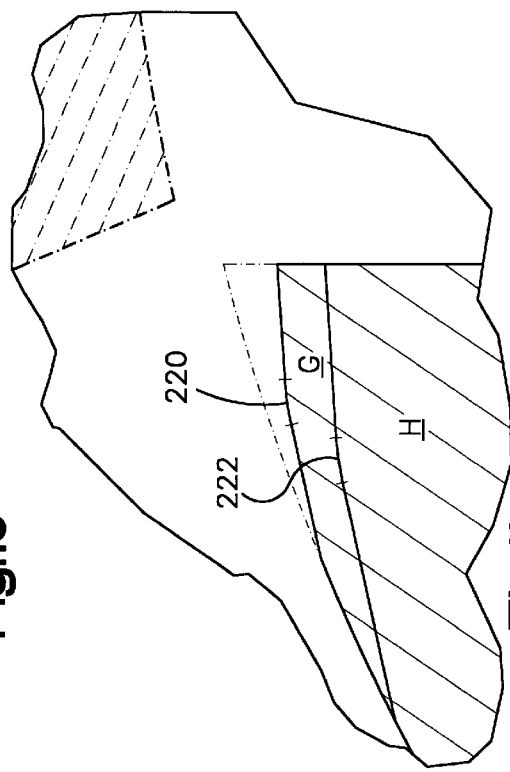
FIG. 11 is a partial view of an apparatus comprising a fifth embodiment of the present invention.

FIG. 11 shows an embodiment of the present invention which is similar to the embodiment shown in FIG. 9. Specifically, the contours G and H of FIG. 11 differ from the contours C and D of FIG. 9 in that the contours G and H are defined in part by arcuate surfaces 220 and 222, respectively, which are located between their corresponding pairs of planar facets. Like the C and D contours of FIG. 9, the G and H contours of FIG. 11 provide noise reduction as well as a linear valve curve.

Figure 12:
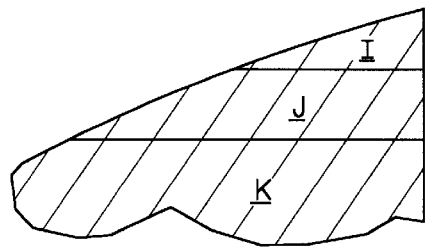
FIGS. 12 and 13 are views of a part of an apparatus comprising a sixth embodiment of the present invention.
Figure 13:
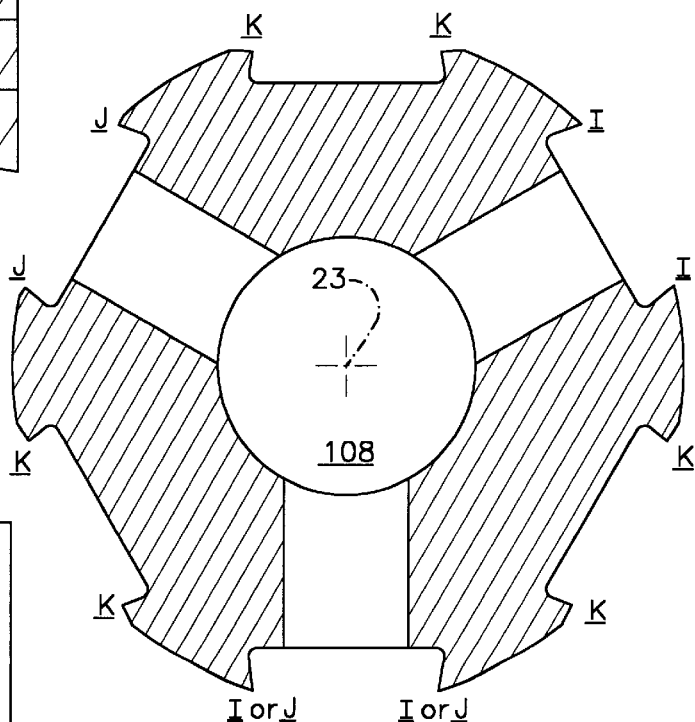

FIG. 12 shows another embodiment of the present invention. This embodiment uses three contours I, J and K at the locations indicated in FIG. 13. The I contour is the same as the A contour of FIG. 5. The J and K contours are the same as the A and B contours of FIG. 8, respectively. The embodiment of FIG. 12 thus causes orifices at the three different contours I, J and K to reach fully constricted conditions at three corresponding staggered times.

From the above description of the invention, those skilled in the art will perceive improvements, changes and modifications. For example, the present invention is equally applicable to a relatively rotatable valve part having more or less than six lands and grooves. Such improvements, changes and modifications within the skill of the art are intended to be covered by the appended claims.

Having described the invention, the following is claimed:

1. Apparatus comprising:

a steering gear control valve including a valve core rotatable within a valve sleeve, said core and said sleeve having grooves and lands with corners defining fluid flow orifices;

said orifices including pairs of orifices that are located to constrict in parallel between a corresponding pair of adjacent inlet ports and a corresponding return port upon relative rotation of said core and said sleeve from neutral positions;

said lands on said core having configurations such that said orifices in each of said pairs begin to constrict at the same time, and subsequently reach fully constricted conditions at staggered times, upon said relative rotation of said core and said sleeve from said neutral positions;

every land on said core having a chamfered corner and a non-chamfered corner.

2. Apparatus as defined in claim 1 wherein said lands on said sleeve includes lands with inlet ports facing opposed grooves in said core, said grooves in said core including grooves with return ports facing opposed lands on said sleeve.

3. Apparatus as defined in claim 2 wherein each of said lands on said sleeve has a pair of non-chamfered corners.

* * * * *